United States Patent
Nordin et al.

(10) Patent No.: US 7,848,233 B2
(45) Date of Patent: Dec. 7, 2010

(54) METHOD AND A COMMUNICATION PLATFORM FOR PACKET COMMUNICATION BETWEEN A SERVICE PROVIDER IN A FIRST NETWORK AND A RADIO COMMUNICATION DEVICE IN A SECOND NETWORK

(75) Inventors: Andreas Nordin, Stockholm (SE); Daniel Malmkvist, Stockholm (SE); Gustav Söderström, Bromma (SE); Johan Edlund, Uppsala (SE); Johan Gertéll, Stockholm (SE); Martin Holst Swende, Skarholmen (SE); Thomas Backelin, Stockholm (SE)

(73) Assignee: YAHOO! Inc., Sunnyvale, CA (US)

( * ) Notice: Subject to any disclaimer, the term of this patent is extended or adjusted under 35 U.S.C. 154(b) by 750 days.

(21) Appl. No.: 11/571,391

(22) PCT Filed: Jun. 15, 2005

(86) PCT No.: PCT/SE2005/000921

§ 371 (c)(1), (2), (4) Date: Sep. 13, 2007

(87) PCT Pub. No.: WO2006/000921

PCT Pub. Date: Jan. 12, 2006

(65) Prior Publication Data

US 2010/0135199 A1 Jun. 3, 2010

(30) Foreign Application Priority Data

Jun. 30, 2004 (SE) .................................. 0401683

(51) Int. Cl.
*H04J 1/16* (2006.01)
(52) U.S. Cl. ..................... 370/230; 370/310.2; 370/401
(58) Field of Classification Search .............. 370/310.2, 370/328, 338, 349, 401, 402, 465, 230, 431
See application file for complete search history.

(56) References Cited

U.S. PATENT DOCUMENTS 5,390,252 A * 2/1995 Suzuki et al. ............... 380/247

(Continued)

FOREIGN PATENT DOCUMENTS

EP 05752601.4 6/2005

(Continued)

OTHER PUBLICATIONS

U.S. Appl. No. 60/868,321, filed Dec. 1, 2006.

(Continued)

*Primary Examiner*—Brenda Pham
(74) *Attorney, Agent, or Firm*—Frommer Lawrence & Haug LLP; Jamie L. Wiegand

(57) ABSTRACT

The present invention relates to a communication platform for packet communication between at least one service provider in a first network and a radio communication device in a second network, the second network comprises a first network node provided to, at least partly, handle communication between the radio communication device and a gateway located in the second network. The gateway is provided to handle communication between the second network and the communication platform, and the communication platform comprises an application programming interface provided to handle two-way communication between the service provider and the radio communication device.

6 Claims, 7 Drawing Sheets

U.S. PATENT DOCUMENTS

| | | | |
|---|---|---|---|
| 6,075,860 A * | 6/2000 | Ketcham | 713/159 |
| 6,580,906 B2 * | 6/2003 | Bilgic et al. | 455/422.1 |
| 2002/0138622 A1 | 9/2002 | Dorenbosch et al. | |
| 2003/0139174 A1 * | 7/2003 | Rao | 455/418 |
| 2003/0229595 A1 | 12/2003 | Mononen et al. | |
| 2005/0190920 A1 * | 9/2005 | Ahonen | 380/274 |
| 2006/0085419 A1 | 4/2006 | Rosen | |
| 2006/0161599 A1 | 7/2006 | Rosen | |

FOREIGN PATENT DOCUMENTS

| | | |
|---|---|---|
| EP | 05752674.1 | 6/2005 |
| WO | PCT/SE2005/000921 | 1/2006 |

OTHER PUBLICATIONS

U.S. Appl. No. 11/571,396, filed Dec. 28, 2006.

* cited by examiner

US 7,848,233 B2

METHOD AND A COMMUNICATION PLATFORM FOR PACKET COMMUNICATION BETWEEN A SERVICE PROVIDER IN A FIRST NETWORK AND A RADIO COMMUNICATION DEVICE IN A SECOND NETWORK

TECHNICAL FIELD

The present invention relates to a communication platform for supporting communication between a service provider and a radio communication device using packet communication and a method therefore. More specifically the present invention relates to a communication platform for enabling two-way communication between a service provider and a radio communication device and a method therefore.

BACKGROUND OF THE INVENTION

In present day radio communication systems, new radio devices become more and more intelligent and are introduced side-by-side with older radio devices still serving a large community.

The communication capabilities of these radio communication devices are ever increasing and data packet communication is today commonplace, using for instance GPRS (General Packet Radio System). Data communication protocols used by radio communication devices, more specifically cellular radio communication devices, are, among others WAP 1.0 (Wireless Application Protocol), WAP 1.1, WAP 2.0, HTTP (HyperText Transfer Protocol), HTTPS, TCP (Transport Control Protocol), IP (Internet Protocol) etc., where many cellular devices give access only to one or a few of these protocols.

Parallel with the development of more intelligent radio devices are the development of more and more intelligent and demanding services for these radio devices. Since so many different devices are out on the market a service provider oftentimes need to develop a specific service only towards a specific subset of the available radio devices. Not always because the other devices are not capable of handling the service, although this will of course also be the case in many situations, but also since the development cost would soar when the service need to be adapted to the capabilities of the different radio devices.

It would thus be beneficial if a solution could be provided that would reduce development cost for service providers and increase the consumer base.

Another problem in modern radio packet communication networks is the incapability for a service provider to initiate communication towards a radio communication device. Although this has sound reasons in terms of security, many valuable services, such as instant messaging and pushing of live content such as sport results, stock quotes etc, can not be developed without this capability. An additional problem in this respect is that telecommunication operators commonly provides the gateways between intranet and extranet with NAT (Network Address Translation) to increase security. This scheme hides any address information of the radio devices from the service providers, thus increasing the difficulty in establish connections from the service providers to the radio communication devices.

Consequently it would be beneficial if a solution could be provided that gave a radio communication device the capability to receive connections initiated from a service provider.

SUMMARY OF THE INVENTION

It is a main object of the present invention to provide such apparatus and method that at least alleviate the above problems.

These objects among others are, according to a first aspect of the present invention, attained by a communication platform for packet communication between at least one service provider in a first network and a radio communication device in a second network, the second network comprises a first network node provided to, at least partly, handle communication between the radio communication device and a gateway located in the second network. The gateway is provided to handle communication between the second network and the communication platform, and the communication platform comprises an application programming interface provided to handle two-way communication between the service provider and the radio communication device.

By providing a platform for service providers to develop service provider applications, providing a uniform and consistent application programming interface, independent of the capabilities of the individual radio device, development time, and thus money can be saved. Since the communication platform furthermore provides two-way communication, that is, that it is possible for the service provider application to establish connections to the radio device, more elaborate services can be developed.

These objects among others are, according to a second aspect of the present invention, attained by a method for packet communication between a service provider located in a first network and a radio communication device located in a second network, the second network comprises a first network node for communication between the radio communication device and a gateway and the gateway is provided for communication between the first network node and the first network. The method comprises the steps of:

a) sending a request for a communication channel from the radio communication device to a communication platform located in the first network and being in communication with the gateway, b) generating a unique key in the communication platform, c) storing the key in the communication platform in relation to a session context and at least a first data information identifying the radio communication device, d) sending the key to the radio communication device, e) storing the key in the radio communication device, and f) using the at least first data information for establishing a communication channel between the service provider and the radio communication device.

According to the above method the radio device registers at the communication platform and receives an identification key. Since the platform stores the particulars relating to the radio device it is possible for a service provider application to look up the identity, the first data information, of the radio device, or its user, and request a data channel from the communication platform. Thus, it is possible to communicate between the service provider platform and radio device.

According to one variant of the invention the communication platform is provided to set up a control channel between the communication platform and the radio communication device.

The general control channel provides the means for requesting a set-up of a transparent data channel between a service provider application and the radio device. The control channel is constantly present and is re-established if the connection to the radio device is temporarily lost. Thereby the communication platform can always request a connection to the radio device for a service provider application.

According to one variant of the invention the radio communication device comprises a radio device platform providing means for a radio device application to communicate with a service provider application or a radio communication device using the radio device platform and the communication platform.

The radio device platform is a small application in the radio device supporting the functionality of the communication platform. Among other things the radio device platform supports different proprietary protocols and for instance re-sends the unique key when the radio connection has been lost to re-establish and communication channels, including the control channel. The radio device platform is used by for instance a service provider radio device application part for communication with the service provider application part which resides centrally.

According to one variant of the invention, a service provider application is provided to communicate with the radio communication device, through the communication platform, using an application protocol supported by the communication platform and a radio communication device application.

The communication platform supports communication between service provider applications and radio devices by providing an API and communication protocol stacks for all existent radio devices, e.g. using C++, java, Symbian, Windows, Linux etc.

According to one variant of the invention the radio communication device is provided to connect to the communication platform and receive and store first data information generated at the communication platform, and—the communication platform is provided to store the first data information in relation to second data information identifying the radio communication device and a session context in the communication platform.

The first data information can for instance be a unique key identifying the radio device to the communication platform. The key is stored in a look-up register such as for instance a RMI (Remote Method Invocation) registry, Corba registry or proprietary registry object, together with information relating to the radio device, such as ID, phone number, IMSI, IMEI etc. and session/connection/socket context.

According to one variant of the invention the communication platform is provided to generate a unique key upon reception of a connection from the radio communication device uniquely identifying the radio communication device, and to send the key to the radio communication device.

According to one variant of the invention the radio communication device is provided to send the received key to the communication platform whenever connection is resumed after a temporary loss of connection.

The radio device platform is provided to send the key to the communication platform if the communication channel is lost. The key identifies the session in the communication platform and the session/connection can be re-established. Thus, the platform provides means for establishing a persistent connection with the radio device, and the individual service provider applications need not to care about this complication relating to the radio interface.

According to one variant of the invention the service provider is provided to use the second data information in the communication platform to initiate communication to the radio communication device.

The second data information may for instance be a SIP-address, which may be used by a service provider application for establishing a connection to a radio device. The SIP-address is looked-up in the look-up register and a session context is identified. This session context can then be used to establish a data channel to the radio device.

According to one variant of the invention the communication platform is provided to establish a data channel with the radio communication device using the control channel.

The control channel is used to set-up a data channel between the radio communication device and a session in the communication platform. This session is then related to another session connected to a service provider application or another radio device and a communication channel is thereby established.

According to one variant of the invention the system comprises at least a second radio communication device having a control channel established to the communication platform and wherein the first radio communication device is provided to establish a data channel, through the communication platform, to the second radio communication device using the control channel.

As is mentioned elsewhere in this text, the communication platform provides possibilities to connect two radio communication devices.

According to one variant of the invention the radio communication device is provided to connect to the communication platform using the HTTP-protocol, and the communication platform is provided to delay a HTTP-response to any HTTP-request from the radio communication device, and the radio communication device is provided to send a new HTTP-request upon reception of a HTTP-response to thereby establish a communication channel.

Some radio device do not support native TCP/IP, but only HTTP. To establish a persistent control channel between such a radio device and the communication platform, a HTTP-request needs to be continuously active. Therefore the radio device platform is provided to send a new HTTP-request to the communication platform whenever a HTTP-response is received from the communication platform. To reduce the number of signalling over the HTTP-protocol the communication platform is provided to delay the HTTP-response to HTTP-requests received from the radio device. The HTTP-response can then be used by the communication platform to send control signals, or data signals, to the radio device.

According to one variant of the invention the communication platform receives and stores information about the state of the radio communication device and any application of the service provider.

The communication platform can store the state of the radio device and service provider applications, and thereby provide possibilities for the service provider application to be state-less. That is, the service provider applications need not to monitor state-changes of the radio device.

According to one variant of the invention the service provider application is an application in a second radio communication device.

The service provider application can also be an application in a radio communication device, such as a cellular telephone or a PDA (Personal Digital Assistant) which is connected to a radio network. Thus, it is possible for two radio communication devices to communicate using packet data communication.

According to one variant of the invention the second radio communication device is located in said second network.

According to one variant of the second aspect of the invention, a control channel is established between the radio communication device and the communication platform using the method steps a) to e).

According to one variant of the invention according the second aspect a data channel request is sent from a service provider to the communication platform, requesting a data channel from the service provider to the radio communication device, the control channel for the radio communication device is identified, a data channel is established between the radio communication device and the platform using the control channel, and data is sent between the service provider and the radio communication device using the data channel.

According to one variant of the second aspect of the invention a data packet is received from the service provider to the communication platform, the data packet is stored at the communication platform, the data packet is sent to the radio communication device, an acknowledgement packet from the radio communication device indicating the successful reception of the data packet is received, and the data packet is re-sent to the radio communication device if the acknowledgement packet is not received within a specified time period or if the acknowledgment packet indicates a failure in the reception of the data packet at the radio communication device.

According to one variant of the second aspect of the invention the communication platform comprises a plurality of communication platform units and where a first communication platform unit of the communication platform units comprises a database relating the key with the identity of the communication platform unit handling the session. The method comprises the further steps of:—receiving a key at a second of the communication platform units, —sending a identity request comprising the key to the first communication platform unit, —receiving a communication platform unit identity from the first communication platform unit at the second platform unit identifying a handling communication platform unit, —sending the key to the handling platform unit, and—responding to the radio communication device from the handling platform unit.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
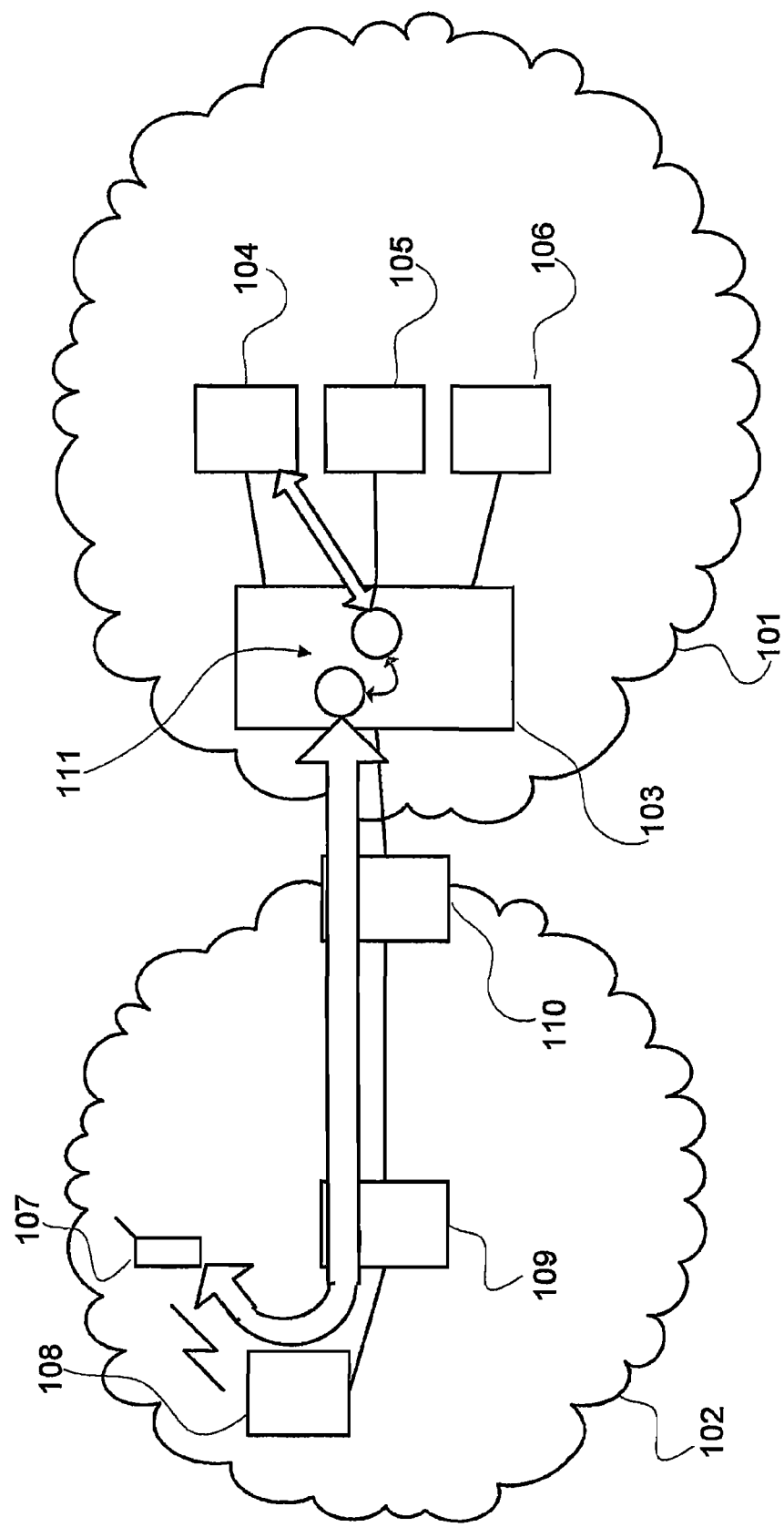
FIG. 1 is a schematic block diagram of one variant of the communication platform according to the invention.

FIG. 1 is a schematic block diagram of a preferred embodiment according to the invention illustrating a first data packet network 101 and a second data packet network 102. In the first network 101 is a communication platform 103, to be further disclosed below, located hosting first, second and third service provider applications denoted 104, 105 and 106 respectively. The service provider applications can each be developed by independent service providers, and will provide different services to radio communication devices located in the second network 102, such as instant messaging and pushing of live content such as sport results and stock quotes. One such radio communication device is shown in FIG. 1 and denoted 107.

The radio communication device 107 is in radio communication with a BTS/BSC 108, which in turn, is connected to a SGSN 109 (Serving Gprs Support Node) for providing GPRS support to the radio communication device 107. The SGSN 109 is connected to a GGSN 110 (Gateway Gprs Support Node). The GGSN acts as a gateway between the second network 102 and other foreign networks, such as the first network 101. Thus, the GGSN 110 acts as a connection point for the communication platform 103 to the second network 102. A NAT (Network Address Translation) and firewall functionality is also provided between the first and second network according to common techniques, to increase the security in the second network 102.

Session objects 111, to be further described below, provides an interface for the first service provider application 104 towards the radio communication device 107, for two-way communication them between. As is shown in FIG. 1, the communication platform 103 hides the specifics regarding the radio communication device 107, and provides extra services to the service provider application 104, such as QoS (Quality of Service), flow control/transaction security, abstraction of device specific communication capabilities, scaling, load balancing, billing etc, all to be further described below. This means that the service provider, when designing the service provider application 104, need not consider complications such as lost connections, support of different protocols, flow control etc.

Figure 2:
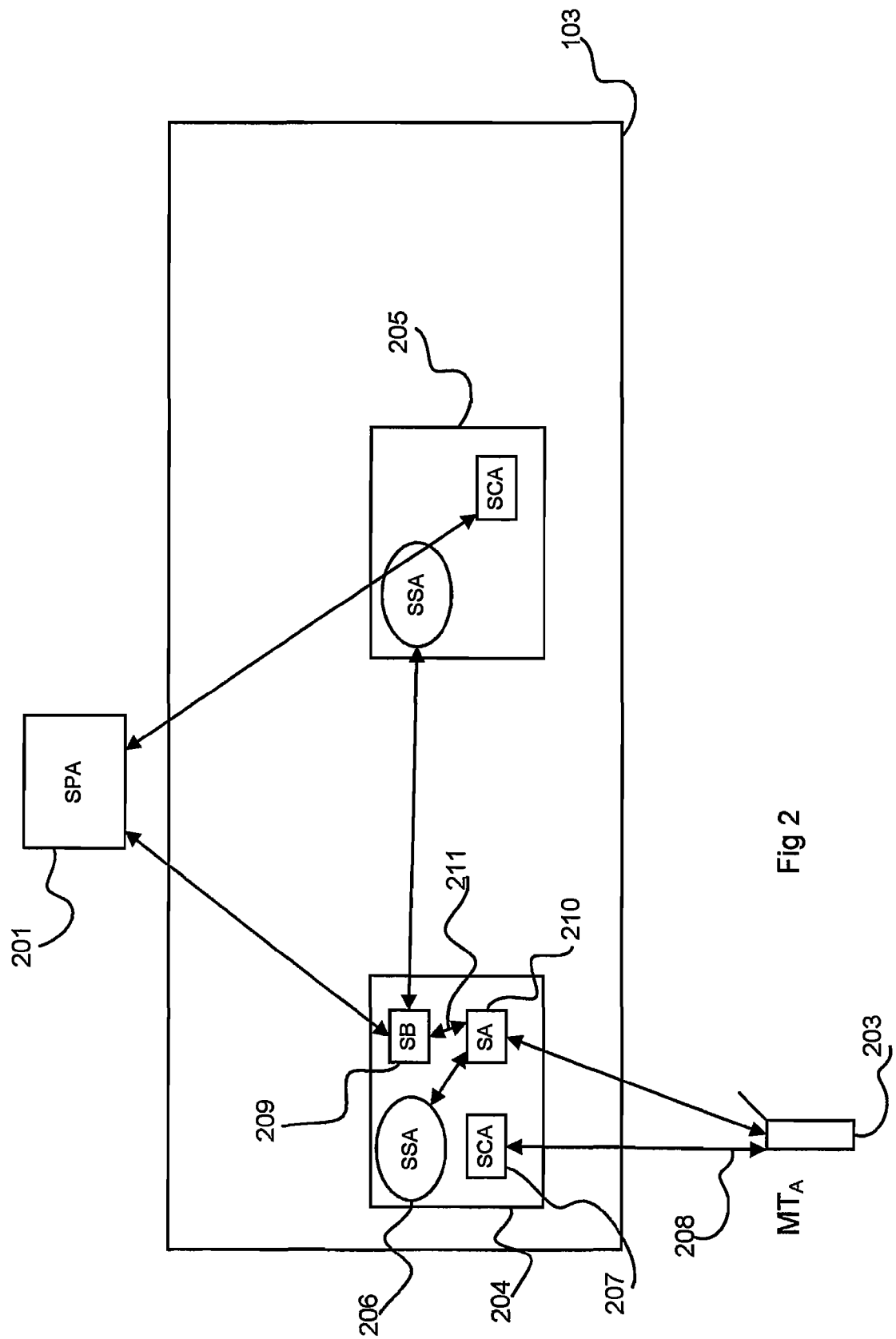
FIG. 2 is a schematic connection diagram between a service provider application and a radio communication device according to one variant of the invention.
Figure 3:
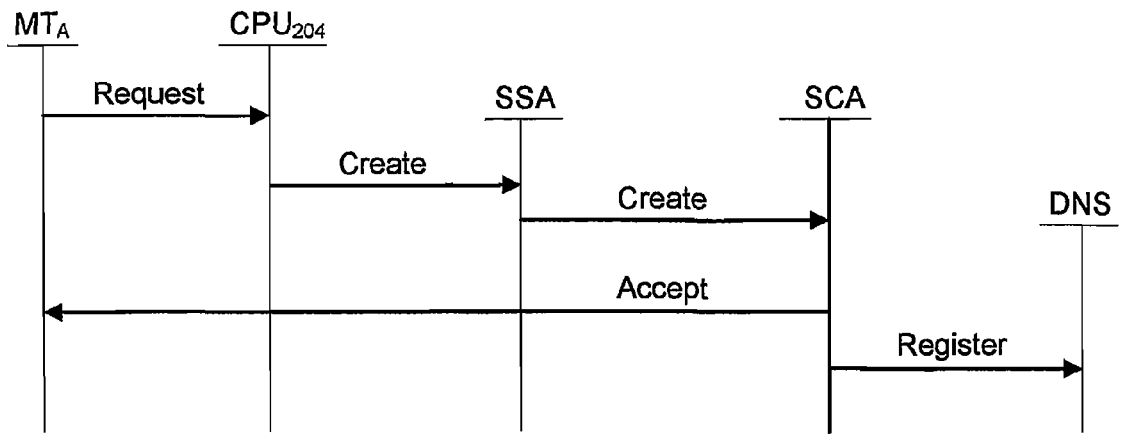
FIG. 3 is a schematic signalling diagram illustrating creation of a control channel between a radio communication device and one variant of the communication platform according to the invention.

FIG. 2 is a schematic connection diagram for a communication platform 103 according to a preferred embodiment of the present invention. FIG. 3 is a schematic signalling diagram for establishing a control channel in a communication platform 103 according to a preferred embodiment of the present invention. FIGS. 2 and 3 disclose communication between a first service provider application 201 and a radio communication device 203, also denoted $MT_A$.

The radio communication device 203, denoted $MT_A$ in FIG. 3 sends a connection request 301 to a first communication platform unit 204 (CPU in FIG. 3). The communication platform 103 also comprises a second communication platform unit 205. The communication platform units may for instance be common computers.

The CPU 204 receiving the connection request 301 from the radio communication device $MT_A$ creates, with a signal 302, a super-session object 206, denoted SSA, for the $MT_A$. In the signal 302 is specific connection details included enabling the CPU 204 to send messages to the radio communication device $MT_A$. The SSA generates a unique key, representing the $MT_A$ and stores this key together with a reference to a Session-Control object 207, SCA. The SSA 206 register its process identity in a look-up register, such as a RMI registry, Corba registry or proprietary registry object, together with the generated unique key and address information identifying the radio communication device and/or its user, for instance a SIP-address (Session Initiation Protocol). The key is finally sent to the $MT_A$ in an accept message 304.

Thus, a control channel 208 has been established between the communication platform and the radio communication device 203.

Figure 4:
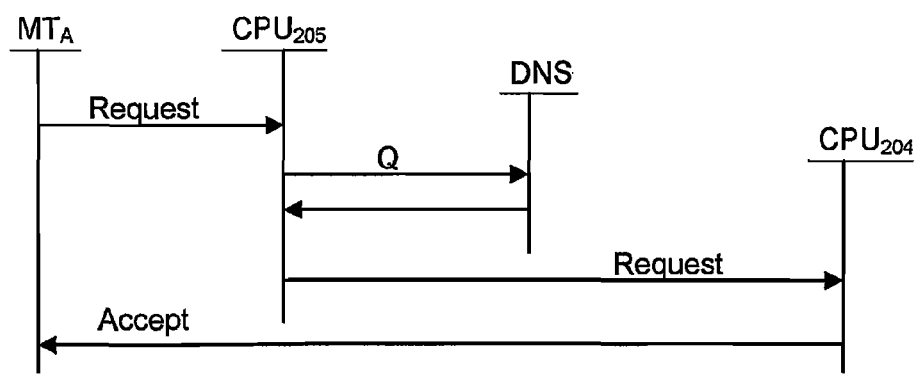
FIG. 4 is a schematic signalling diagram illustrating restoration a communication channel between a radio communication device and one variant of the communication platform according to the invention.

FIG. 4 is a signalling diagram disclosing the signalling when the connection to the radio communication device is lost and again restored. It is not uncommon that the transmission between the radio device 203 and the communication platform may be lost due to for instance radio shadow etc. The communication platform can however deal with this situation, without interruption of the service to the service provider application 201.

When the radio device 203 discovers that a channel has been lost, for instance the control channel 208 described in connection with FIG. 3, it sends a request, comprising the previously received key, to the communication platform. This request may be received by any CPU in the communication platform 103, for instance CPU 205. The CPU 205 will then send a question to the look up register including the received key. The look up register looks up the key and finds the process identity of the super-session 206 related to this key, and thereby to the radio device 203 sending the request. The CPU 205 sends the request to the CPU 204 which sends an accept message to the radio device 203, whereby the control channel is re-established. If data channels (described below) were established they would be re-established in a similar way if disconnected.

Figure 5:
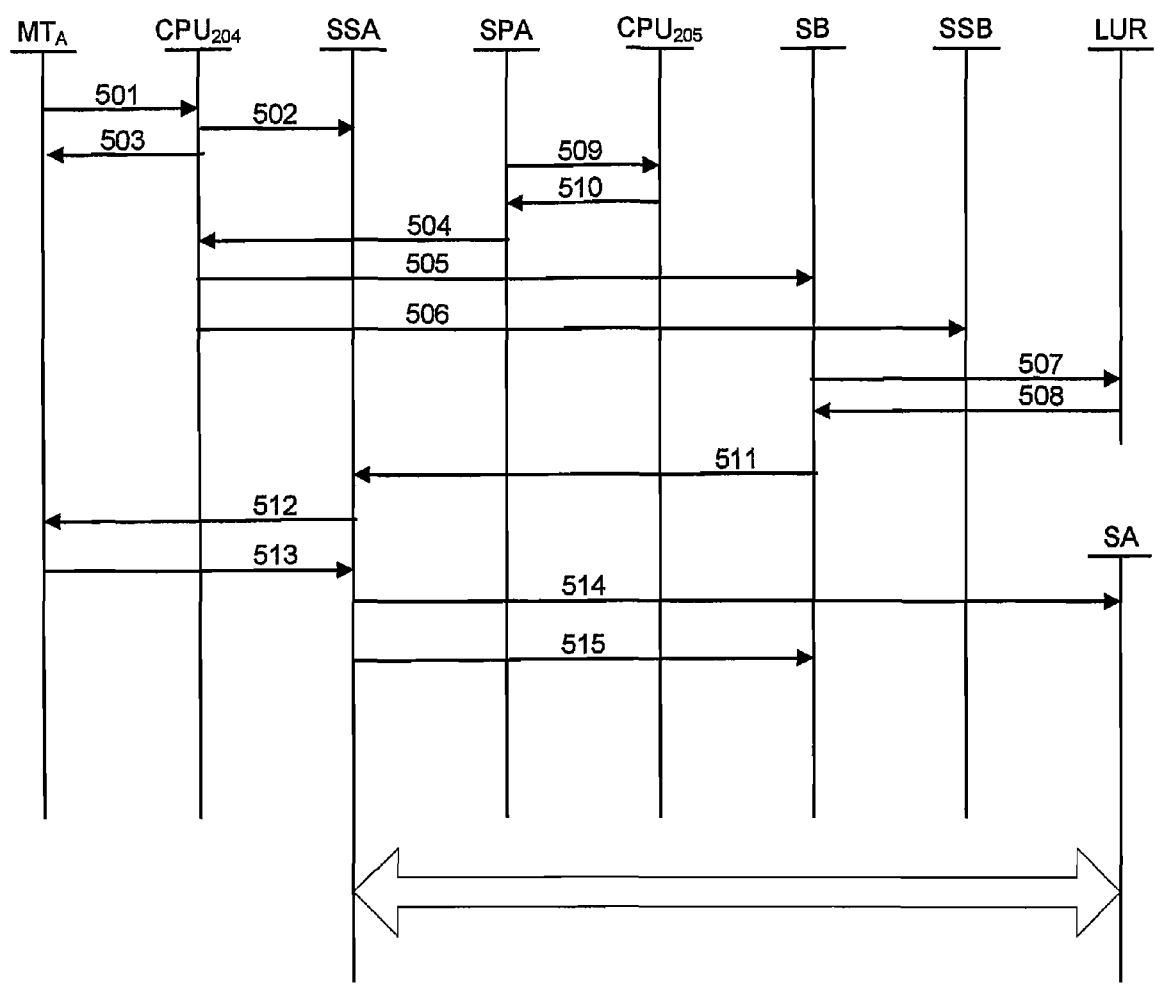
FIG. 5 is a schematic signalling diagram illustrating establishment of a communication channel between a radio communication device, and one variant of the communication platform according to the invention.

FIG. 5 is a signalling diagram disclosing establishment of a data channel between the service provider application 201 and the radio communication device 203 initiated by the service provider 201.

Firstly, the radio device 203 needs to establish a server connection. That is, a connection which other may connect to. This is performed by sending, from the radio device 203, a Create_Server_Socket message 501 to the communication platform. The message comprises the key identifying the SSA 206 and thus a Server Connection, or a server socket, can be registered in the SSA 206 with the message Register 502. The registration is acknowledge in message 503. The physical connection or the session is however not yet created. Now, the radio device 203 is ready to receive connections on the server socket, and applications may thus connect to the radio device 203.

To connect to the radio device 203, the SPA (service provider application) 201 sends a connect message 509 to the communication platform using the control channel and the communication platform answers with a message 510 comprising a selected CPU to use for the channel to be established, in this case the CPU 204. The SPA 201 sends a connect message 504, which comprises an address to the radio device 203 or its user, preferably but not necessarily an SIP-address, to the CPU 204. The CPU 204 creates 505 a session object SB, denoted 209 and registers 506 the session SB in the SSB using the supplied key.

The session object SB 209, now sends a query 507 to the look-up register (LUR) supplying the address of the radio device $MT_A$ 203. The look-up register answers 508 with the process identification and the CPU ID handling the super-session for the specified address that is the radio device 203. The session SB 209 then sends a connect message 511 to the so identified super-session SSA 206. The SSA 206 then stores the process reference to the session SB 209.

The super-session SSA sends a connection request message 512 to the radio device 203 including a specific CPU IP-address, using the established control channel. The radio device 203 assumingly accepts the connection in a message 513 and a dedicated socket/session to the specific CPU in the platform is created for this connection. A session object SA 210 is then created 514 and registered in the SSA 206. The SSA 206 finally sends an accept message 515 to the session SB identifying the newly created session SA 210 and thus is a data channel 211 between the service provider application 201 and the radio device established using the two sessions SA 210 and SB 209.

Data is sent from the service provider application 201 to the radio device 203 by transferring data from the SPA 201, to the session SB 209, from the session SB 209 to the session SA 210, and finally from the session SA 210 to the radio device 203. Since the communication platform has control over the data flow it is possible to introduce for instance flow control.

Even tough the present invention has been described in relation to a server connecting to a radio device, the opposite may also occur, that is, the present invention may of course be used by a radio device connecting to a service provider application. Moreover, the present invention may also be used for connection two radio communication devices. In general terms, and in using the present invention, there are no difference between a radio communication device and a service provider application when it comes to creating connections between such units.

Figure 6:
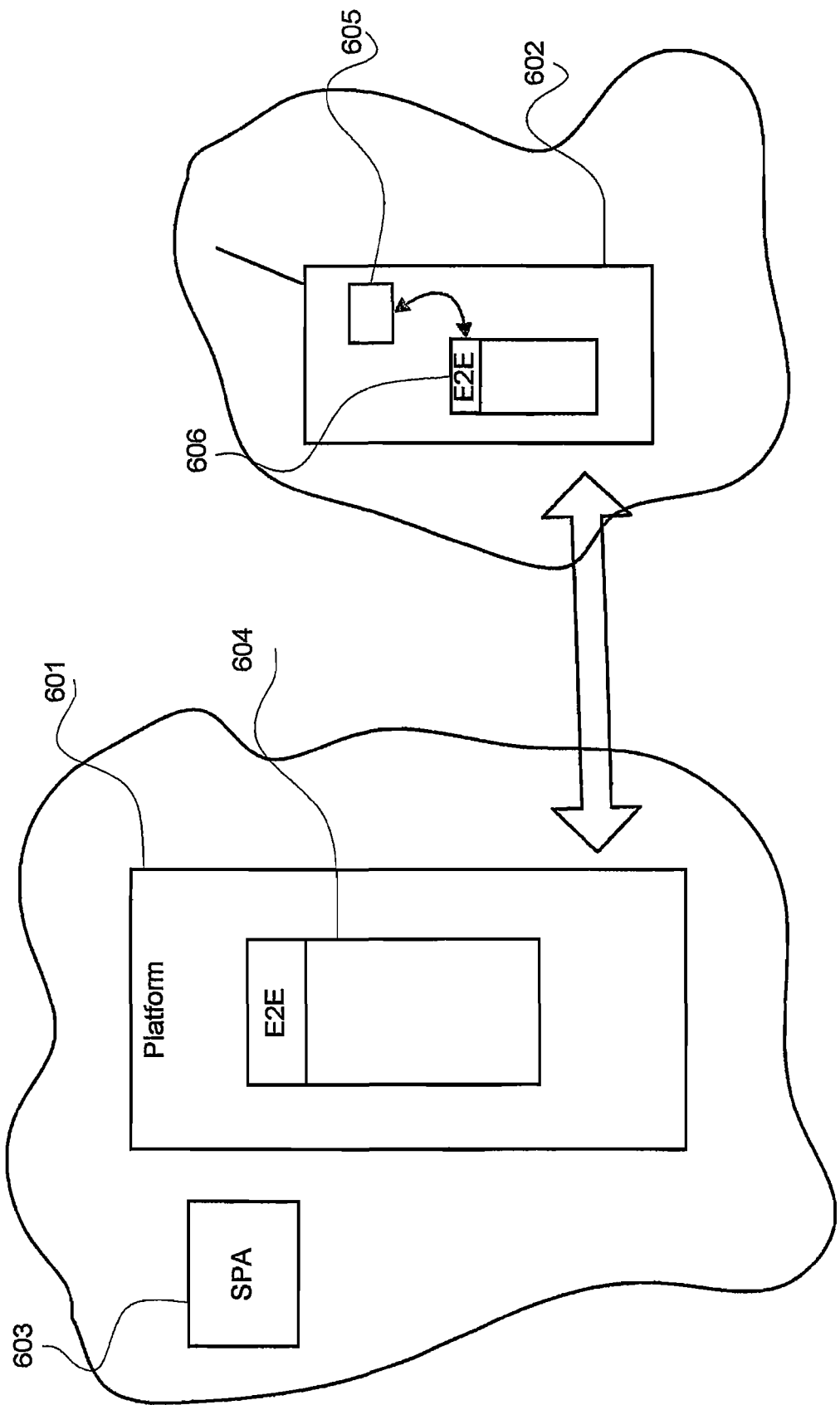
FIG. 6 is a schematic block diagram of the platform and a radio device, disclosing different protocol stacks according to a variant of the present invention.

FIG. 6 is a schematic block diagram of the platform 601 and a radio device 602, disclosing a protocol stack. As is clearly seen from FIG. 6 the present invention provides abstraction for a service provider by providing an application programming interface to the service provider for communication with the radio device 602. A service provider application SPA 603 uses an API (not shown) and a protocol stack 604 to convey data to and from the radio device 602. Likewise, an application 605 in the radio device, which can be a specific service provider application or a generic radio device application utilizes an application programming interface API (not shown) and a protocol stack 606 in the radio device for communication with the service provider application. Thus, it is clear that the invention comprises two separate parts, one implemented in the communication platform, which may be an ordinary computer, and the other in the radio device. These parts use a proprietary protocol stack for communication with each other, providing the means for a service provider to reach different radio devices.

Figure 7:
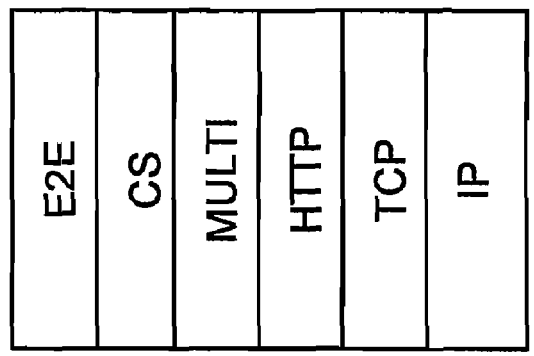
FIG. 7 is a schematic block diagram of two protocol stacks according to a variant of the invention.
Figure 7:
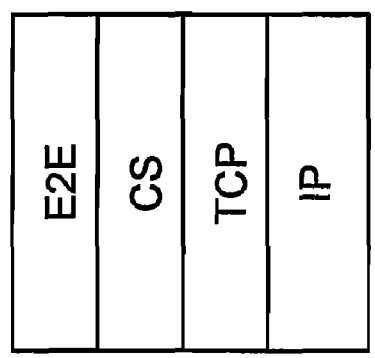

FIG. 7 is a schematic block diagram of two protocol stacks according to the invention. The protocol stacks 701 and 702 both comprises, as the top-most protocol, an E2E (End-to-End) protocol for communication between two clients. The E2E protocol supports acknowledged data transfer and flow control between clients. Under the E2E protocol is a CS protocol, or Client-Server protocol and supports client to server communication. The first protocol stack 701 ends with the TCP/IP stack part which is commonly known. The second protocol stack 702 however further comprises a MULTIPLEXING protocol, which supports multiple 2-way soft or emulated sockets supporting multiple connections or channels over a single HTTP protocol connection.

Figure 8:
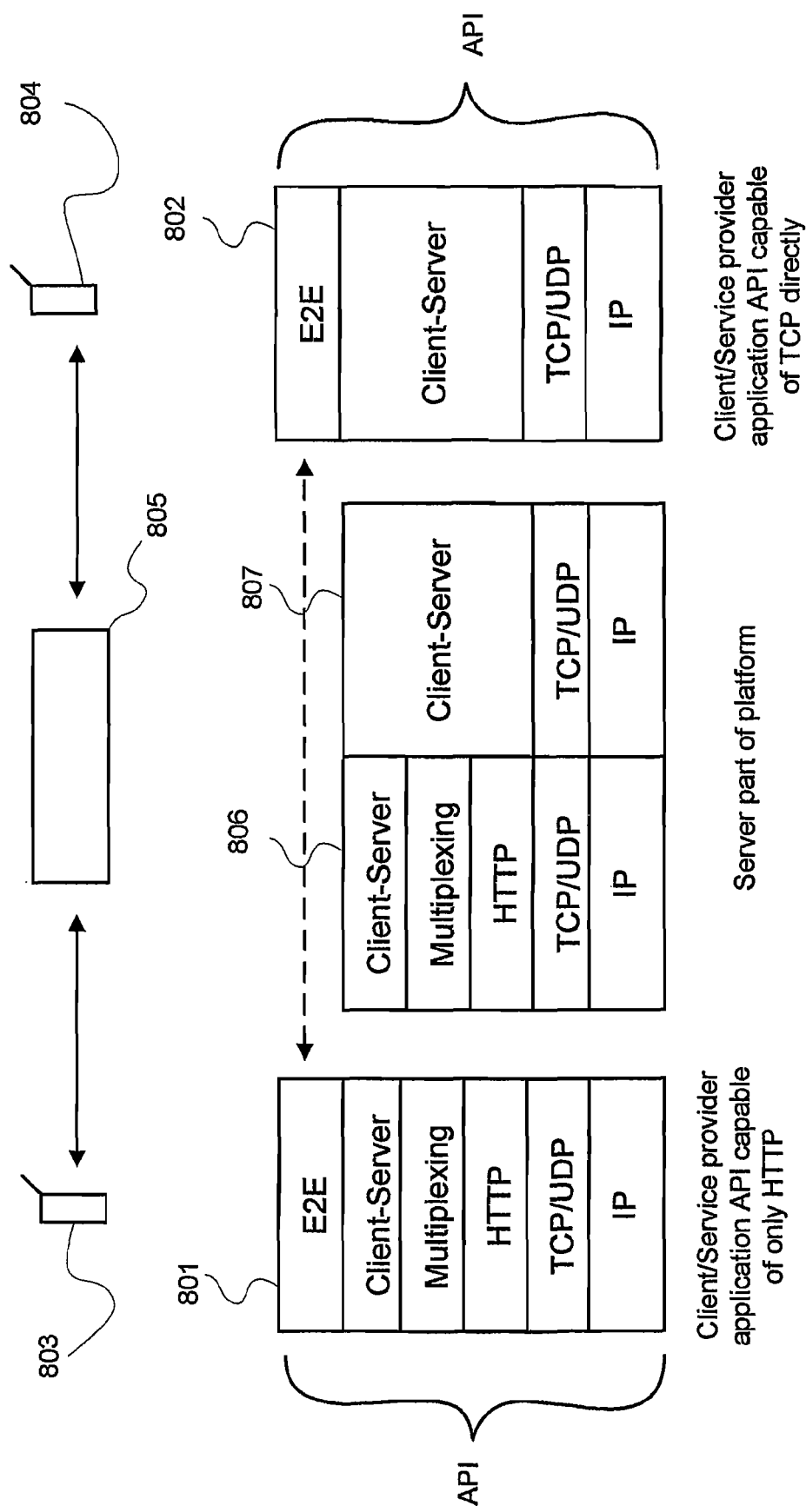
FIG. 8 is a schematic block diagram of the protocol stack in FIG. 7 in greater detail.

FIG. 8 is a schematic block diagram of the protocol stack in FIG. 7 in greater detail disclosing communication between a first client/server 803 only giving access to the http-protocol 801 and a second client/server 804 giving access to the TCP/UDP protocol 802. The devices communicate using the E2E protocol which conceals the added complexity to the service provider application. That is, the service provider application need not worry about what protocols the device is capable of handling, but can use the transparent E2E protocol. A platform 805 comprises two protocol stacks, 806 and 807, handling the translation between the different protocol stacks. Although this embodiment discloses communication between two radio devices it is also applicable when one of the client/server is service provider application residing on a computer.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for packet communication between a service provider located in a first network and a radio communication device located in a second network, said second network comprises a first network node for communication between said radio communication device and a gateway and said gateway is provided for communication between said first network node and said first network, the method comprising the steps of:
   a) sending a request for a communication channel from said radio communication device to a communication platform located in said first network and being in communication with said gateway;
   b) generating a unique key in said communication platform;
   c) storing said key in said communication platform in relation to a session context and at least a first data information identifying said radio communication device;
   d) sending said key to said radio communication device;
   e) storing said key in said radio communication device; and
   f) using said at least first data information for establishing a communication channel between said service provider and said radio communication device.

2. The method according to claim 1, comprising the further step of:
   if the communication between said radio communication device and said communication platform is lost, sending said key, stored in said radio communication device, from said radio communication device to said communication platform when said communication between said radio communication device and communication platform is restored.

3. The method according to claim 1, comprising the further step of:
   establishing a control channel between said radio communication device and said communication platform using the steps a) to e).

4. The method according to claim 1, comprising the steps of:
   sending a data channel request from said service provider to said communication platform, requesting a data channel from said service provider to said radio communication device,
   identifying a control channel for said radio communication device,
   establishing said data channel between said radio communication device and said communication platform using said control channel, and
   sending data between said service provider and said radio communication device using said data channel.

5. The method according to claim 1, comprising the steps of:—receiving a data packet from said service provider to said communication platform,
   storing said data packet at said communication platform,
   sending said data packet to said radio communication device,
   waiting for an acknowledgement packet from said radio communication device indicating a successful reception of said data packet, and
   resending said data packet to said radio communication device if said acknowledgement packet is not received within a specified time period or if said acknowledgment packet indicates a failure in the reception of said data packet at said radio communication device.

6. The method according to claim 1, wherein said communication platform comprises a plurality of communication platform units and where a first communication platform unit of said plurality of communication platform units comprises a database relating said key with an identity of the communication platform unit handling a session, comprising the further steps of:
   receiving said key at a second of said plurality of communication platform units,
   sending a identity request comprising said key to said first communication platform unit,
   receiving a communication platform unit identity from said first communication platform unit at said second platform unit identifying a handling communication platform unit,
   sending said key to said handling communication platform unit, and
   responding to said radio communication device from said handling communication platform unit.

* * * * *

UNITED STATES PATENT AND TRADEMARK OFFICE
CERTIFICATE OF CORRECTION

| | | |
|---|---|---|
| PATENT NO. | : 7,848,233 B2 | Page 1 of 1 |
| APPLICATION NO. | : 11/571391 | |
| DATED | : December 7, 2010 | |
| INVENTOR(S) | : Andreas Nordin et al. | |

It is certified that error appears in the above-identified patent and that said Letters Patent is hereby corrected as shown below:

On the Title page, in field (87), in column 1, line 1, delete "WO2006/000921" and insert -- WO2006/004488 --, therefor.

Signed and Sealed this
Seventh Day of February, 2012

David J. Kappos
*Director of the United States Patent and Trademark Office*